(12) United States Patent
Gilbert et al.

(10) Patent No.: US 7,711,627 B2
(45) Date of Patent: May 4, 2010

(54) METHODS AND SYSTEMS FOR PROVIDING CROSSING MARKETS

(75) Inventors: Andrew C. Gilbert, Califon, NJ (US); Mary Ann Gilbert, legal representative, Califon, NJ (US); Glenn D. Kirwin, Scarsdale, NY (US); Joan Kirwin, legal representative, Scarsdale, NY (US)

(73) Assignee: BGC Partners, Inc., New York, NY (US)

( * ) Notice: Subject to any disclaimer, the term of this patent is extended or adjusted under 35 U.S.C. 154(b) by 1518 days.

(21) Appl. No.: 10/040,837

(22) Filed: Jan. 7, 2002
(Under 37 CFR 1.47)

(65) Prior Publication Data
US 2003/0139998 A1    Jul. 24, 2003

(51) Int. Cl.
*G06Q 40/00*  (2006.01)
(52) U.S. Cl. .......................................... 705/37; 705/35
(58) Field of Classification Search .............. 705/35–45
See application file for complete search history.

(56) References Cited

U.S. PATENT DOCUMENTS

| | | | |
|---|---|---|---|
| 5,689,652 A * | 11/1997 | Lupien et al. | 705/37 |
| 6,098,051 A | 8/2000 | Lupien et al. | 705/37 |
| 6,112,189 A | 8/2000 | Rickard et al. | 705/37 |
| 6,618,707 B1 * | 9/2003 | Gary | 705/36 R |
| 2003/0177126 A1 * | 9/2003 | Weingard et al. | 707/10 |
| 2004/0236614 A1 * | 11/2004 | Keith | 705/4 |
| 2004/0236636 A1 * | 11/2004 | Lutnick et al. | 705/26 |

FOREIGN PATENT DOCUMENTS

| | | | |
|---|---|---|---|
| WO | WO 98/12659 | * | 3/1998 |
| WO | WO 00/26834 | * | 5/2000 |
| WO | WO 01/04717 | * | 1/2001 |
| WO | WO 03/036540 A1 | | 5/2003 |

OTHER PUBLICATIONS

Weisul, Kimberly. The Investment Dealers' Digest : IDD. New York: Aug. 26, 1996. vol. 62, Iss. 35; Leveling the trading field.*
Posit, ITG Inc., at http://www.itginc.com/products/posit/posit_more.html (printed Jan. 7, 2002).

* cited by examiner

*Primary Examiner*—Kambiz Abdi
*Assistant Examiner*—Sarah M Monfeldt
(74) *Attorney, Agent, or Firm*—Glen R. Farbanish

(57) ABSTRACT

Methods and systems for providing and implementing crossing markets are provided. These methods and systems preferably include facilitating trading at crossing markets by establishing crossing market trading rules, incentivizing crossing market participants, and improving the efficiency of crossing market trading.

24 Claims, 2 Drawing Sheets

METHODS AND SYSTEMS FOR PROVIDING CROSSING MARKETS

BACKGROUND OF THE INVENTION

This invention relates to crossing markets. A crossing market or "crossing" is a designated time that buyers and sellers meet to transact on a given issue of a traded bond or to trade a pre-determined tradeable instrument. The traders or dealers present at the crossing insure the liquidity of the instrument being traded. The customers provide the volume of the trade.

Large institutional customers seek liquidity when trading securities. Liquidity allows the institutional customers to trade large volumes of instruments—e.g., fixed-income securities or other tradeable securities. Typically, the institutional customers obtain more favorable conditions for large blocks of instruments to be traded when the market volume is high. Nevertheless, customers do not make the large market; dealers and traders do. Therefore, crossings, which include numerous dealers and traders as well as large numbers of customers, satisfy the need to seek added liquidity without requiring dealer and trader participation in the trades by combining the markets of individual dealers and traders. Furthermore, crossings efficiently funnel liquidity into pre-determined packets of time and equilibrium—i.e., generally accepted—price levels. Because the institutional customers know prior to the crossing which securities will be traded, they realize that they can benefit from the added liquidity provided by the other dealers, traders and institutional customers without having to make the market themselves.

Dealers and traders also benefit from supporting crossings because the dealers and traders have an opportunity to increase their exposure to additional customers and, if designed properly, the crossing provides the respective customers of the dealers and traders with advantageous pricing conditions.

Thus, crossings provide highly efficient markets for trading of tradeable securities.

It would be desirable to provide further benefits to dealers, traders and customers to encourage participation in a crossing.

SUMMARY OF THE INVENTION

It is an object of this invention to provide further benefits to dealers, traders and customers to encourage participation in a crossing.

A method for providing a crossing market for trading a tradeable instrument preferably includes providing crossing market rules that govern the trading in the crossing market, receiving a plurality of bid-offer liquidity spreads, receiving a plurality of customer orders, determining an order imbalance based on the customer orders, selecting a bid-offer liquidity spread from the plurality of bid-offer liquidity spreads, and calculating a crossing price based on the order imbalance and the selected bid-offer liquidity spread.

The providing crossing market rules may further include requiring participation in a series of crossing markets. The providing crossing market rules may further include requiring adherence to the crossing market rules. The selecting a bid-offer liquidity spread may include selecting a bid-offer liquidity spread based on the proximity of a midpoint of the selected bid-offer liquidity spread to the price of the order imbalance. The calculating a crossing price may include calculating a volume-based weighted average between a midpoint of the selected bid-offer liquidity spread and a last-executed trade. The calculating a crossing price may include calculating a volume-based weighted average between a midpoint of the selected bid-offer liquidity spread and the order imbalance. The method may further include incentivizing market makers to provide liquidity by rewarding a market maker that controls a majority or a pre-determined minority of the trading with a reduced securities buy price and an increased securities sale price.

A system for providing a crossing market for trading a tradeable instrument may include means for providing crossing market rules that govern the trading in the crossing market, means for receiving a plurality of bid-offer liquidity spreads, means for receiving a plurality of customer orders, means for determining an order imbalance based on the received plurality of customer orders, means for selecting a bid-offer liquidity spread from the plurality of bid-offer liquidity spreads, and means for calculating a crossing price based on the order imbalance and the selected bid-offer liquidity spread.

The means for providing crossing market rules may further include means for requiring adherence to the crossing market rules. The means for selecting a bid-offer liquidity spread may include means for selecting a bid-offer liquidity spread based on the order imbalance. The means for selecting a bid-offer liquidity spread may include means for selecting a bid-offer liquidity spread based on the proximity of a midpoint of the selected bid-offer liquidity spread to the price of the order imbalance. The means for calculating a crossing price may include means for calculating a volume-based weighted average between a midpoint of the selected bid-offer liquidity spread and a last-executed trade. The system may further include means for incentivizing market makers to provide liquidity by rewarding a market maker that controls a majority or a pre-determined minority of the trading with a reduced securities buy price and a increased securities sale price.

Methods and systems according to the invention may also include specific methods of calculating the crossing price and specific methods of incentivizing participants in the crossing market.

BRIEF DESCRIPTION OF THE DRAWINGS

Further features of the invention, its nature and various advantages will be more apparent from the following detailed description of the preferred embodiments, taken in conjunction with the accompanying drawings, in which like reference characters refer to like parts throughout, and in which.

DETAILED DESCRIPTION OF THE INVENTION

Figure 1:
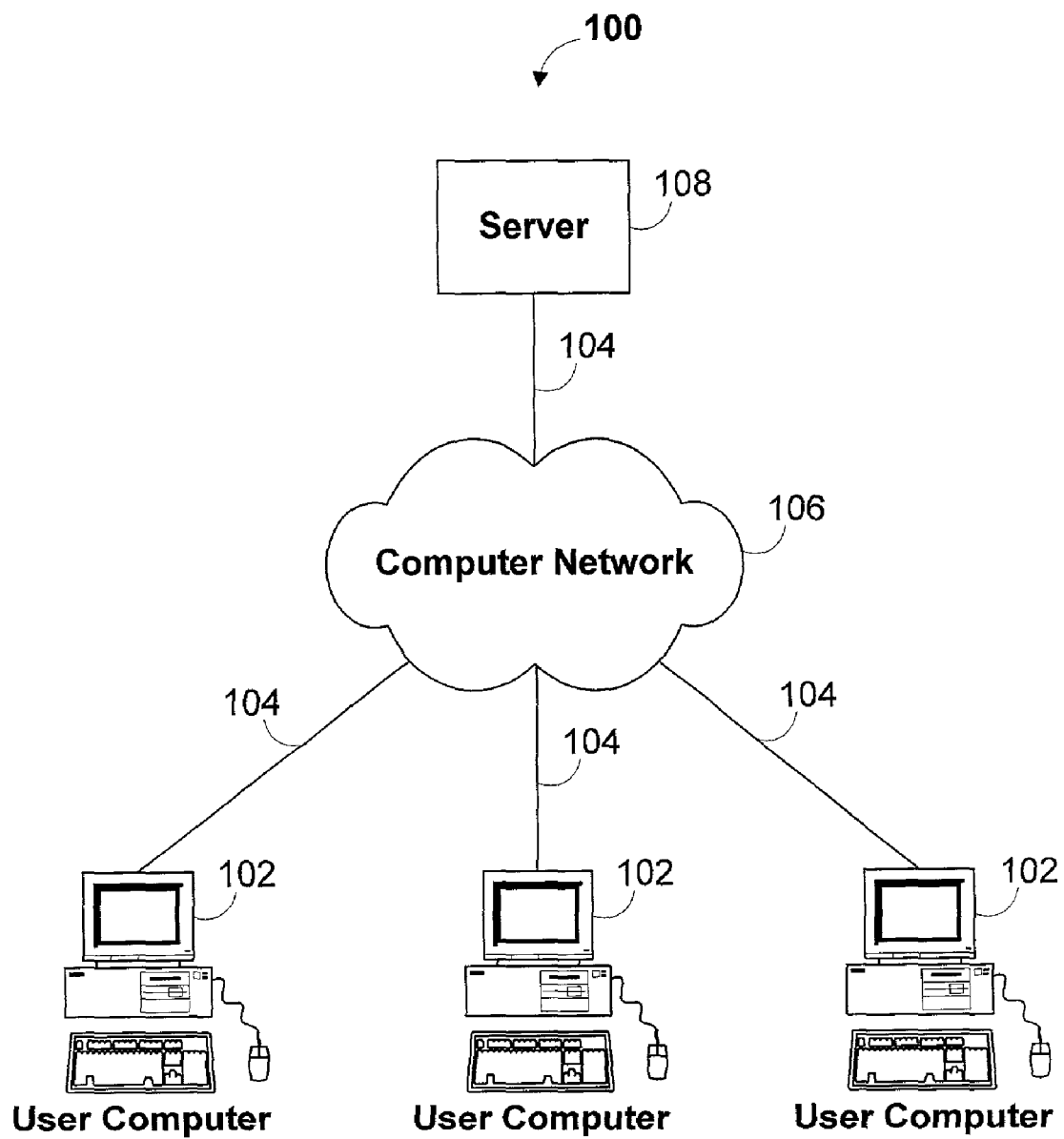
FIG. 1 is an illustration of an electronic implementation of a trading system according to the present invention.

Additional advantages that may be used to induce more participation in crossings include offering additional trading benefits to participants. These trading benefits may be realized in an electronic trading system according to the invention.

One example of principles that embody a trading method and/or trading algorithm which may be used to induce dealer participation according to the invention is as follows. Assume for the purposes of this illustration that the instrument being traded is the ten-year treasury bond or note. Assume further that the crossings occur every hour on the hour of the trading day for the "on-the-runs"—i.e., the most recently-issued, and most liquid, bonds. (In another embodiment of this invention, a trading algorithm may include a mechanism for measuring, determining, and developing, trading interest in the "off-the-runs"—i.e., the less-recently-issued, and less liquid, bonds.)

At the time of the crossing, each dealer preferably provides a BOLS (Bid Offer Liquidity Spread). Each BOLS, or a selected number of the BOLSs, is preferably shown on the screen of each of the crossing participants. The BOLS represents a spread for a certain pre-determined size of offering from which a dealer is willing to make a two-sided market—i.e., the BOLS shows how much the dealer is willing to pay to buy a pre-determined number of the instrument being traded and how much he will take to sell the instrument being traded. The smaller the spread of the two-sided market that the trader or dealer (also referred to as the "market maker") is willing to make, the more securities he trades at the crossing.

In the method according to the invention, when a particular market maker provides the most aggressive spread such that he controls the crossing—i.e., he participates in the majority, the most substantial minority, or some other pre-determined ratio of the trades of a crossing—he may receive additional information as to the size of the crossing, the amount of imbalance of buyers and sellers, the names of participating market makers, and a securities price that benefits himself as well as other primary market makers. Thus, the method according to the invention preferably includes incentivizing—i.e., providing incentives to—the most active and aggressive market makers by awarding them with more information and greater monetary benefits for themselves and/or their customers.

A particular example of the operation of an algorithm according to the invention follows. One dealer or trader BOLS may be at a spread of 1/32 for 200 bonds. This may be displayed as 0.01×200 on the screens of the other crossing participants. Another dealer may show a BOLS of 0.014×300 or a spread of 1½ 32nd for 300 bonds.

Before, simultaneously to, or after the BOLS is shown, customers may anonymously enter their desire to either buy or sell. They also enter the amount (commonly referred to as the size) of their respective order. If the market makers note an imbalance in the potential markets, the market makers may adjust their respective BOLSs accordingly; either by changing the size or changing the prices. If no imbalance is noted, then the market makers may present their respective BOLSs as is.

In this example, one buyer exists for 200 and one seller for 100. Thus, there is an imbalance of 100 on the buy side. At this point, one of the market makers' BOLS offer will be selling 100 to balance the crossing. To determine the price of the sale of 100, the first market maker with the 0.01 spread "makes" his market by preferably presenting an offer to buy 200 at 100.02 and an offer to sell 200 at 100.03. To determine the price of the 100 to be sold at the crossing, an average is calculated between the BOLS: in this case the 100 trades at 100.025 (commonly referred to in the industry as 100.02+). This number represents the match at which the first crossing customer buys 100 and the first crossing customer sells 100. It should be noted that a customer of the dealer preferably sells and not the dealer himself. Thus, a market is made at 100.02+.

Then, the next price for the crossing is preferably determined as follows. A volume-based weighted average or other suitable metric is calculated between the previously determined match—i.e., 100.02+—and the offer side of the market maker—i.e., 100.03. Thus, the crossing spread is to buy a suitable volume (in this example 100 was still on the board) at 100.02+ and to sell a suitable volume at 100.0275 (the weighted average between the previously determined match and the offer side of the market maker.) The market maker's spread remains the same—i.e., to buy at 100.02 and to sell at 100.03, but the crossing has a smaller spread which results in automatically-generated volume at the crossing without market maker participation.

This method is preferably reiterated—i.e., different weighted averages may be taken with different market maker's spreads and different customer orders—until each of the customer orders have been filled at the crossing spread. Each of the automatically generated spreads and trades preferably account for all the market makers' spreads and all the customer volume that are within range of the crossing spread. Once the two-sided price is repeatedly established, each of the customers has his orders filled at the calculated two-sided price. Customers whose prices are not tradable—i.e., not compatible with the two-sided price—are preferably thrown out.

A preferable fee arrangement for the crossing according to the invention may be as follows. Customers may pay a fee for entering the crossing, while the system and the dealers split the collected fees according to a pre-determined arrangement. Customers that buy or sell, lower or higher, respectively, than their previously agreed upon—e.g., at the time of the crossing, or alternatively, during the crossing—prices may also pay a fee. Furthermore, market makers that choose to fill customers that do not have another customer to take the other side of the trade may also receive added benefits because these market makers added volume to the crossing in addition to adding liquidity. In order to solve the problem of customers who cannot pay fees, or who do not want to pay fees, the fee structure may preferably be built into the price of the trades.

Performance of the trades may preferably be guaranteed by a credit-worthy corporate entity that provides and controls the system or platform upon which the crossing is implemented. In the alternative, a crossing market according to the invention may also be implemented by a consortium of entities where one, or a number, of the entities provides the system or platform and one, or a number, of the entities guarantees performance of the trades as well as provides liquidity and customers to the trades.

In another embodiment of the invention, each of the participants agree that at the pre-determined hours of trading in the crossing market, each of the participants in the market accepts that the trading criteria of the market govern trading for a pre-determined time, T.

FIG. 1 is an illustration of an electronic implementation of a dynamic security system in accordance with certain aspects of the present invention. As shown, system 100 may include one or more user computers 102 that may be connected by one or more communication links 104 and a computer network 106 to a trading server 108.

In system 100, user computer 102 may be a computer, processor, personal computer, laptop computer, handheld computer, personal digital assistant, computer terminal, a combination of such devices, or any other suitable data processing device. User computer 102 may have any suitable device capable of receiving user input and displaying user choices.

Communications links 104 may be optical links, wired links, wireless links, coaxial cable links, telephone line links, satellite links, lightwave links, microwave links, electromagnetic radiation links, or any other suitable communications links for communicating data between user computers 102 and trading server 108.

Computer network 106 may be the Internet, an intranet, a local area network (LAN), a wide area network (WAN), a metropolitan area network (MAN), a virtual private network (VPN), a wireless network, an optical network, an asynchronous transfer mode network (ATM), a cable network, a frame relay network, a digital subscriber line network (DSL), or any other suitable network.

Trading server 108 may be a processor, a computer, a data processing device, or any other suitable server capable of processing electronic trades of dynamic securities.

All trading interactions between user computers 102 preferably occur via computer network 106, trading server 108, and communications links 104. Traders or users at user computers 102 may conduct trading transactions using suitable input devices connected to or part of user computers 102.

Figure 2:
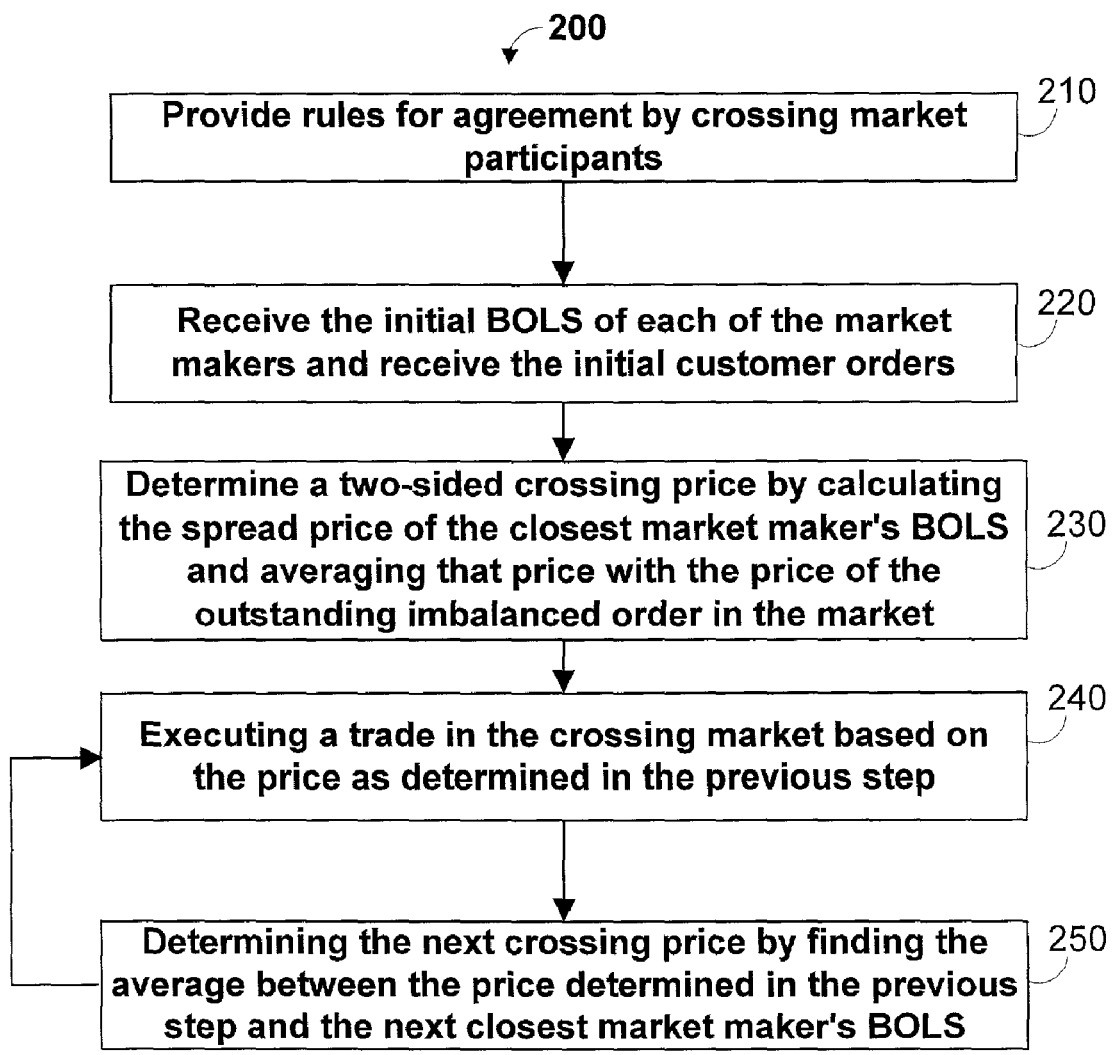
FIG. 2 is a flow chart of a method according to the invention.

FIG. 2 shows a flow chart 200 of a method for trading in a crossing market according to the invention. In step 210, rules governing the operation and trading of the crossing market are preferably provided to which each of the participants of the crossing market agree to be bound. In step 220, the respective initial BOLS of each of the market makers is preferably received and the respective initial orders of each of the customers are preferably received. An order imbalance may be determined at this point.

In step 230, the platform preferably determines a two-sided crossing price (or, alternatively, a trading price) by calculating the spread price—i.e., the midpoint—of the closest market maker's BOLS and averaging that price with the price of an outstanding imbalanced order in the market. In step 240 a trade is then executed, preferably between customers, at the crossing price. Step 250 shows that the next crossing price is determined by finding the average between the price determined in step 240 and next closest market maker's BOLS. In this manner, a large volume of trades can be quickly executed at preferably advantageous price points for the participants of the crossing.

It should be noted that the particular metrics described herein for determining the prices, may be adjusted to fit the particular needs of an individual crossing, group of market makers, or customers. These metrics as described above include taking a weighted average of the last executed price with the market maker's selling price, taking a weighted average of the last executed price with the market maker's buying price, or, alternatively, averaging the last executed price with the next closest market maker's BOLS or some other suitable metric.

Once the metric is determined, it may be implemented as part of the automatic crossing market trading. The implementation of an automatic trading algorithm obtains a distinct advantage in high-volume trading situations such as a crossing.

In addition to increased customer exposure and advantageous pricing conditions, another benefit obtained by dealers and traders in crossings is that the dealers and traders may receive certain trading priorities in return for the liquidity they provide. The crossing system generates volume by uniting large buyers and large sellers at one time. A dealer or trader commitment to participate in one crossing, or in each of a series of crossings, may cause the committed dealers to be rewarded with trading priority with respect to certain customers that otherwise they would not be exposed to. This trading priority may be implemented through the trading method and/or trading algorithm. One way to implement the trading priority may be that when two market makers show an identical BOLS, the market maker with the trading priority may preferably be awarded the trade—e.g., he or his customers may be able to trade before the customers of the market maker without the trading priority.

Accordingly, systems and methods for providing and implementing crossing markets are provided. It will be understood that the foregoing is merely illustrative of the principles of the invention and the various modifications can be made by those skilled in the art without departing from the scope and spirit of the invention, which is limited only by the claims that follow.

What is claimed is:

1. A method, comprising:
    receiving by a server, in a crossing market, a plurality of bid-offer liquidity spreads from a plurality of market-markers;
    receiving by the server, in the crossing market, a plurality of orders from a plurality of customers via respective computers in use by the customers, the server being communicatively coupled to the computers via a network;
    matching by the server, at least in part, the plurality of orders;
    determining by the server, based on the matching of the orders, an order imbalance;
    selecting by the server a first bid-offer liquidity spread from the plurality of bid-offer liquidity spreads;
    calculating by the server, based on the first bid-offer liquidity spread, a first crossing price;
    filling by the server the matched orders at the first crossing price;
    selecting by the server a second bid-offer liquidity spread from the plurality of bid-offer liquidity spreads;
    calculating by the server, based on the second bid-offer liquidity spread, a second crossing price,
        in which calculating the second crossing price comprises calculating an average between a midpoint of the second bid-offer liquidity spread and a last-executed trade price; and
    filling by the server, at least in part, the order imbalance at the second crossing price using volume provided by one of the plurality of market makers.

2. The method of claim 1, in which the last-executed trade price is calculated based on a bid-offer liquidity spread other than the first and the second bid-offer liquidity spreads.

3. The method of claim 1, in which the volume provided by the market maker comprises, at least in part, volume provided by at least one customer of the market maker.

4. An apparatus comprising a computing device operable to:
    receive, in a crossing market, a plurality of bid-offer liquidity spreads from a plurality of market-markers;
    receive, in the crossing market, a plurality of orders from a plurality of customers via respective computers in use by the customers, the computing device being further operable to communicate with the computers via a network;
    match at least in part the plurality of orders;
    determine, based on the matching of the orders, an order imbalance;
    select a first bid-offer liquidity spread from the plurality of bid-offer liquidity spreads;
    calculate, based on the first bid-offer liquidity spread, a first crossing price;
    fill the matched orders at the first crossing price;
    select a second bid-offer liquidity spread from the plurality of bid-offer liquidity spreads;
    calculate, based on the second bid-offer liquidity spread, a second crossing price, in which to calculate the second crossing price comprises to calculate an average between a midpoint of the second bid-offer liquidity spread and a last-executed trade price; and fill at least in part the order imbalance at the second crossing price using volume provided one of the plurality of market makers.

5. The apparatus of claim 4, in which the volume provided by the market maker comprises, at least in part, volume provided by at least one customer of the market maker.

6. A method, comprising:
receiving by a server, in a crossing market, a plurality of bid-offer liquidity spreads from a plurality of market-markers,
in which each bid-offer liquidity spread comprises a respective buying price and selling price;
receiving by the server, in the crossing market, a plurality of orders from a plurality of customers via respective computers in use by the customers, the server being communicatively coupled to the computers via a network;
matching by the server, at least in part, the plurality of orders;
determining by the server, based on the matching of the orders, an order imbalance;
selecting by the server a bid-offer liquidity spread from the plurality of bid-offer liquidity spreads;
calculating by the server, based on the selected bid-offer liquidity spread, a first crossing price;
filling by the server the matched orders at the first crossing price;
calculating by the server, based on the selected bid-offer liquidity spread, a second crossing price,
in which calculating the second crossing price comprises calculating an average between the first crossing price and one of:
the buying price of the first bid-offer liquidity spread, and
the selling price of the first bid-offer liquidity spread; and
filling by the server, at least in part, the order imbalance at the second crossing price using volume provided by one of the plurality of market makers.

7. The method of claim 6, in which the crossing market comprises a crossing market for trading a fixed-income security.

8. The method of claim 6, further comprising incentivizing the plurality of market makers to provide liquidity to the crossing market by causing additional information to be provided to a market maker that controls the crossing, in which the additional information comprises at least one of:
a size of the crossing market,
an amount of the order imbalance, and
names of participating market makers.

9. The method of claim 6, further comprising incentivizing the plurality of market makers to provide liquidity to the crossing market by providing to a market maker that controls the crossing at least one of:
a reduced buy price, and
an increased sale price.

10. The method of claim 6, further comprising causing crossing market rules that govern trading in the crossing market to be provided to the plurality of market makers, in which the crossing market rules comprise at least one of:
first rules for requiring participation in a series of crossing markets, and
second rules for requiring adherence to the crossing market rules.

11. The method of claim 6,
in which the plurality of orders comprise a plurality of buy orders and a plurality of sell orders; and
in which the order imbalance comprises one of:
a portion of the plurality of buy orders, and
a portion of the plurality of sell orders.

12. The method of claim 6, in which at least one of the plurality of market makers comprises at least one of:
a dealer, and
a trader.

13. The method of claim 6, in which the volume provided by the market maker comprises, at least in part,
volume provided by at least one customer of the market maker.

14. The method of claim 6,
in which the plurality of orders comprises a plurality of buy orders and a plurality of sell orders;
in which the order imbalance comprises a portion of the plurality of buy orders;
in which calculating the average comprises calculating the average between the first crossing price and the selling price of the first bid-offer liquidity spread; and
in which the second crossing price is calculated based on the first crossing price and the calculated average.

15. The method of claim 6,
in which the plurality of orders comprises a plurality of buy orders and a plurality of sell orders;
in which the order imbalance comprises a portion of the plurality of sell orders;
in which calculating the average comprises calculating the average between the first crossing price and the buying price of the first bid-offer liquidity spread; and
in which the second crossing price is calculated based on the first crossing price and the calculated average.

16. The method of claim 6,
in which the selected bid-offer liquidity spread comprises a first bid-offer liquidity spread; and
in which filling at least in part the order imbalance comprises filling a first portion of the order imbalance at the second crossing price;
the method further comprising, after filling the first portion of the order imbalance:
selecting by the server a second bid-offer liquidity spread from the plurality of bid-offer liquidity spreads;
calculating by the server, based on the second bid-offer liquidity spread, a third crossing price; and
filling by the server at least a second portion of the order imbalance at the third crossing price.

17. The method of claim 16, in which filling the second portion of the order imbalance at the third crossing price comprises filling the second portion of the order imbalance at the third crossing price using volume provided by at least one of the plurality of market makers.

18. The method of claim 6,
in which filling at least in part the order imbalance comprises filling a portion of the order imbalance at the second crossing price;
the method further comprising:
calculating by the server at least one additional crossing price; and
filing by the server a remaining portion of the order imbalance at the at least one additional crossing price using volume provided by at least one of the plurality of market makers.

19. An apparatus comprising a computing device operable to:
- receive, in a crossing market, a plurality of bid-offer liquidity spreads from a plurality of market-markers,
  - in which each bid-offer liquidity spread comprises a respective buying price and selling price;
- receive, in the crossing market, a plurality of orders from a plurality of customers via respective computers in use by the customers, the computing device being further operable to communicate with the computers via a network;
- match at least in part the plurality of orders;
- determine, based on the matching of the orders, an order imbalance;
- select a bid-offer liquidity spread from the plurality of bid-offer liquidity spreads;
- calculate, based on the selected bid-offer liquidity spread, a first crossing price;
- fill the matched orders at the first crossing price;
- calculate, based on the selected bid-offer liquidity spread, a second crossing price,
  - in which to calculate the second crossing price comprises to calculate an average between the first crossing price and one of:
    - the buying price of the first bid-offer liquidity spread, and
    - the selling price of the first bid-offer liquidity spread; and
- fill at least in part the order imbalance at the second crossing price using volume provided by one of the plurality of market makers.

20. The apparatus of claim 19,
- in which the selected bid-offer liquidity spread composes a first bid-offer liquidity spread;
- in which to fill at least in part the order imbalance comprises to fill a first portion of the order imbalance at the second crossing price; and
- in which the computing device is further operable to:
  - after filling the first portion of the order imbalance:
    - select a second bid-offer liquidity spread from the plurality of bid-offer liquidity spreads;
    - calculate, based on the second bid-offer liquidity spread, a third crossing price; and
    - fill at least a second portion of the order imbalance at the third crossing price.

21. The apparatus of claim 19, in which the volume provided by the market maker comprises, at least in part, volume provided by at least one customer of the market maker.

22. The apparatus of claim 19,
- in which the plurality of orders comprises a plurality of buy orders and a plurality of sell orders;
- in which the order imbalance comprises a portion of the plurality of buy orders;
- in which to calculate the average comprises to calculate the average between the first crossing price and the selling price of the first bid-offer liquidity spread; and
- in which the second crossing price is calculated based on the first crossing price and the calculated average.

23. The apparatus of claim 19,
- in which the plurality of orders comprises a plurality of buy orders and a plurality of sell orders;
- in which the order imbalance comprises a portion of the plurality of sell orders;
- in which to calculate the average comprises to calculate the average between the first crossing price and the buying price of the first bid-offer liquidity spread; and
- in which the second crossing price is calculated based on the first crossing price and the calculated average.

24. The apparatus of claim 19,
- in which to fill at least in part the order imbalance comprises filling a portion of the order imbalance at the second crossing price;
- the computing device being further operable to:
  - calculate at least one additional crossing price; and
  - fill a remaining portion of the order imbalance at the at least one additional crossing price using volume provided by at least one of the plurality of market makers.

* * * * *